KETCHAM & WATERMAN.
Bean Harvester.
No. 18,697. Patented Nov. 24, 1857.
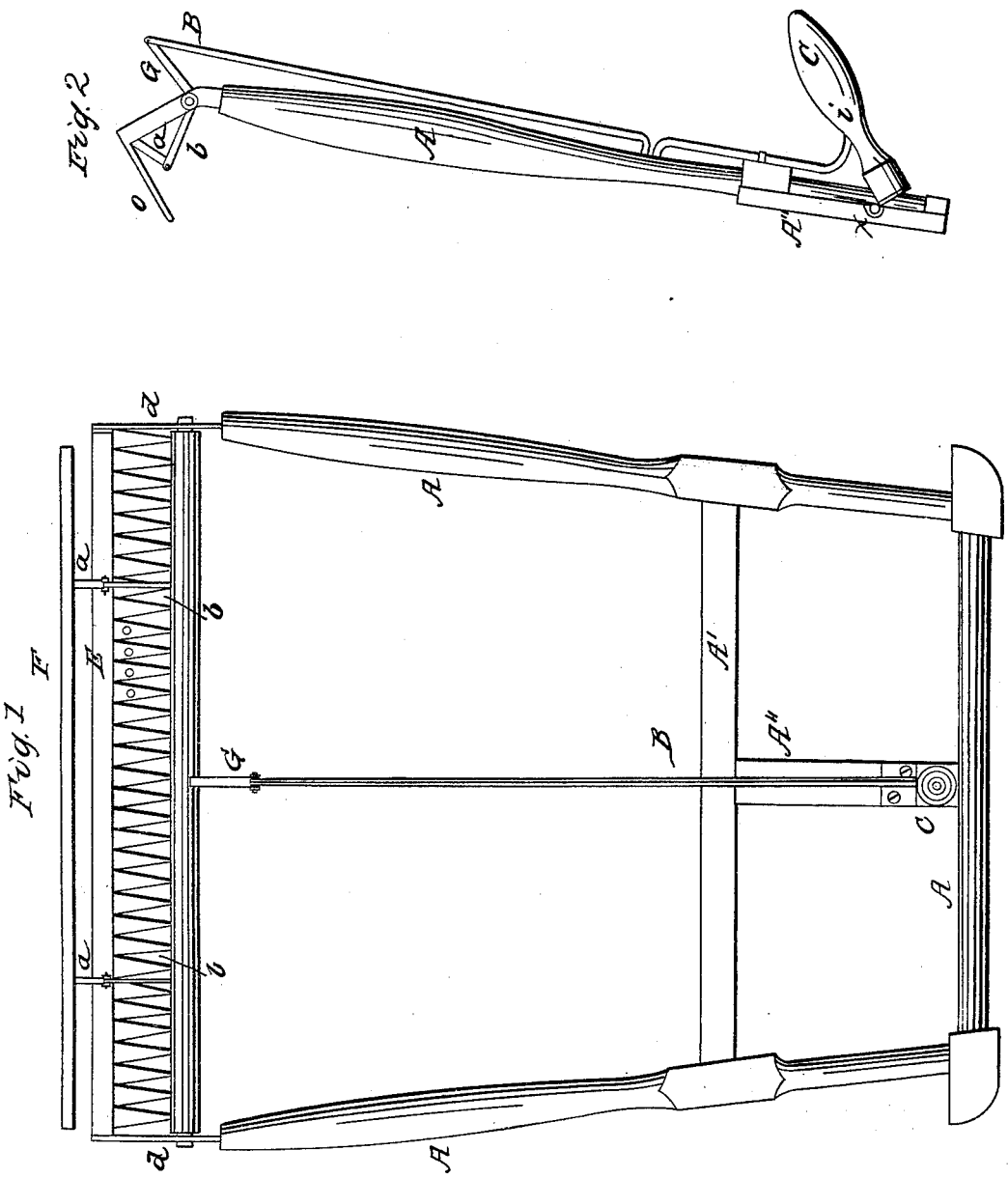

UNITED STATES PATENT OFFICE.

JOSHUA KETCHAM AND JNO. WATERMAN, OF ORANGEPORT, NEW YORK.

IMPROVEMENT IN BEAN-HARVESTERS.

Specification forming part of Letters Patent No. 18,697, dated November 24, 1857.

*To all whom it may concern:*

Be it known that we, JOSHUA KETCHAM and JOHN WATERMAN, of Orangeport, in the county of Niagara and State of New York, have invented a certain new and useful Machine for the Purpose of Harvesting Beans; and we do hereby declare that the following is a full, clear, and exact description of our invention, reference being had to the accompanying drawings, and to the letters of reference marked thereon.

The nature of our invention consists in certain devices for snaring and gathering beans from the vine, the peculiarities of which will be hereinafter described.

In order that others skilled in the arts may construct and use our invention, we will proceed to describe its construction and operation.

In the accompanying drawings, making a part of this specification, Figure 1 is a plan view. Fig. 2 is a side elevation.

In Fig. 1, A A' A'' is the frame-work of the machine. E is the head or gatherer. This head is provided, as seen, with teeth or cutters marked $o$. These teeth are pivoted to the head, and are ground in a working machine to an edge on top in order more easily to disengage the beans and vine. F is a slide for the purpose of assisting in pulling off the beans and vine and of removing them from the head. This slide is connected to roller D by means of levers $a$ and $b$. D is a roller revolving backward and forward by means of lever G and rod B, which connect, as seen, with the handle C. This roller serves to operate slide F, giving it motion, whereby it assists and relieves the head E.

In Fig. 2, A A'' are portions of the frame; $o$, the teeth. $a$ and $b$ are levers for operating slide F. (Seen in Fig. 1.) G is a lever attached to roller D, Fig. 2, and connects with the handle C by means of rod B. Rod B is pivoted to the handle, as seen at $i$. The handle C is hinged to the portion of the frame marked A'' by means of hinge $x$.

For the successful operation of this machine the beans must be drilled in rows, as is now the general mode of planting them where they are produced in large quantities.

In using the machine, when the beans are ready for gathering, the operator, with instrument in hand, stands on one side of the row of beans and lowers it to the ground on the opposite side. Then, with one hand on the frame and one on the handle, he proceeds to draw the machine into the row of beans. When the beans become snared and are held in the teeth he operates the handle C, which acts upon slide F, causing it to assume somewhat the position seen in Fig. 2. The slide catches under the beans, and then the operator, by pulling firmly on the frame and handle at the same time, either dislocates the beans and vines from the roots or brings roots, vines, beans, and all up. Then by reversing the handle the slide carries the beans and vines off from the head, which is then ready to be set in again into the row. It will be seen that either the gravity of the slide or the weight of the beans on the slide will give it its peculiar motion when operated for the purpose of assisting and relieving the head.

The advantage of this machine is its great saving of time and labor. Since the raising of beans has become so popular and extensive in the Northwestern States there has been no mode of gathering them except by hand, pulling them up by hand, shaking the dirt from the roots, and throwing them in piles. This hand-work, of necessity, is very slow and tedious, besides wasting the beans greatly. By the old method of gathering beans one man could only pluck up one-quarter of an acre a day, and that being a hard day's work, bending over the row. By our machine one man will gather an acre of beans a day as a very moderate day's work. The beans are not shelled so much by our machine as they are by hand while gathering. Thus it is a saving of time, labor, and of beans in the operation of gathering.

Having thus fully described our invention, what we claim, and desire to secure by Letters Patent, is—

The slide F, for the purpose of pulling and dislocating the beans and carrying them away over the head, and this slide F in combination with roller D and levers $a$ and $b$, operated by means of levers G, rod B, and handle C, for the purpose of forming a bean-harvester, as herein set forth and described.

JOSHUA KETCHAM.
JOHN WATERMAN.

Witnesses:
LEWIS GRIFFIN,
HENRY KETCHAM.